United States Patent [19]

Gavlin et al.

[11] Patent Number: 5,462,584
[45] Date of Patent: Oct. 31, 1995

[54] PROCESS FOR DEHYDRATING NATURAL GAS

[75] Inventors: Gilbert Gavlin, Lincolnwood; Boris Coltsin, Skokie, both of Ill.

[73] Assignee: Gas Research Institute, Chicago, Ill.

[21] Appl. No.: 237,764

[22] Filed: May 4, 1994

[51] Int. Cl.$^6$ .................................................. B01D 19/00
[52] U.S. Cl. ............................................. 95/231; 55/220
[58] Field of Search ............................... 55/220; 95/156, 95/178, 184, 231, 239

[56] References Cited

U.S. PATENT DOCUMENTS

| | | | |
|---|---|---|---|
| 1,866,560 | 7/1932 | Gordon et al. | 95/231 |
| 2,988,171 | 6/1961 | Arnold et al. | 95/231 |

FOREIGN PATENT DOCUMENTS 595128  11/1947  United Kingdom.

OTHER PUBLICATIONS

Arthur L. Kohl and Fred C. Riesenfeld, "Gas Purification", Fourth Edition, Gulf Publishing Company, Chapter 11.

R. L. Pearce and C. Richard Sivalls, "Fundamentals of Gas Dehydration Design and Operation with Glycol Solutions", 1984.

*Primary Examiner*—C. Scott Bushey
*Attorney, Agent, or Firm*—Speckman, Pauley & Fejer

[57] ABSTRACT

A process for dehydrating natural gas involving the use of a water absorbing composition containing a glycol and an aromatic solubility depressant.

6 Claims, No Drawings

PROCESS FOR DEHYDRATING NATURAL GAS

BACKGROUND OF THE INVENTION

1. Field of the Invention

This invention relates to an improvement in the drying of natural gas. More particularly, it relates to reducing the absorption of aromatics in the dehydrating solvent and, correspondingly, reducing the emission of absorbed aromatics when the solvent is regenerated.

2. Description of Related Art

Natural gas, as it is obtained from underground sources, contains water in varying amounts. This water can lead to corrosion and obstruction of valves and fittings in transmission lines due to condensation, etc., especially when the gas is compressed or cooled. A variety of processes have been developed to reduce the water content.

A reasonably detailed summary of the water vapor problem in natural gas and various means which have been proposed for removing water from natural gas is disclosed in chapter 11, beginning at page 582 of the publication GAS PURIFICATION, Fourth Edition, 1985, Gulf Publishing Company, Kohl & Riesenfeld.

One of the more prominent methods for dehydrating natural gas involves the use of hygroscopic liquids, whereby the gas is passed in contact with liquid glycols, for example, such as ethylene glycol, and polyglycols, namely diethylene glycol and triethylene glycol and blends of such compositions at temperatures of approximately 85°–105° F. As indicated in the foregoing publication, these glycols have unusual hygroscopicity and reasonably good stability to heat and chemical decomposition, together with relatively low vapor pressure. After dehydration the solvents are regenerated by removing absorbed water and then reused.

In our copending application entitled Gas Dehydration Process, Ser. No. 08/215,757 filed Mar. 21, 1994, we have disclosed and claimed a process wherein a composition consisting essentially of a soluble salt from the class consisting of potassium acetate or potassium formate and a glycol can be used to enhance the absorption of water from natural gas. In particular, it has been found that with the addition of one of the aforementioned salts to a glycol, such as diethylene glycol, and in the presence of a relatively small amount of water in the solution the absorption of water from natural gas is improved by from approximately a third to three times. With other glycols the amount of potassium acetate or formate solubility will vary, however, with corresponding improvements in water absorption. For example, triethylene glycol will only absorb about 4% by weight of the potassium salt whereas ethylene glycol will absorb about 40% by weight, with corresponding differences in water absorbency.

Notwithstanding the improved dehydration of natural gas with the use of glycols and potassium acetate or formate, a problem is always present with respect to the concurrent absorption from natural gas in the dehydration solution of aromatics, such as benzene, toluene, ethylbenzene and xylene and to some extent aliphatic hydrocarbons. In regeneration of the dilute dehydration solvent after absorbing water from the gas, the extraction of the concurrently absorbed aromatics poses a serious environmental problem. In the generation process the solvent is concentrated and the aromatics are discharged into the atmosphere. With millions of cubic feet of gas being dehydrated annually, thousands of tons of aromatics are discharged, exceeding environmental regulations. The preferred process would permit absorption of water from the gas while allowing the aromatics to remain with the gas for subsequent combustion with the gas. With the use of potassium acetate or formate in a glycol the absorption of the aromatics is reduced. However, further reduction of aromatics is essential to avoid as much as possible the need to dispose of the aromatics during regeneration of the solvent.

SUMMARY OF THE INVENTION

It has been found that by the use of relatively small amounts of either diphenylmethane or 1,1-diphenylethane in either a glycol alone or a glycol with potassium acetate or potassium formate the reduction of absorption of aromatics in a water absorption composition for natural gas can be appreciably reduced. These particular compositions are especially suitable due to their high boiling points and relatively low melting points as regards the operating temperatures for the water absorption process of natural gas and the solvent regeneration process.

DESCRIPTION OF PREFERRED EMBODIMENTS

It has been found that benzene is soluble to the extent of about 31% by weight in pure diethylene glycol (up to 2% water). With the addition of approximately 15% by weight of diphenylmethane to pure diethylene glycol benzene solubility is reduced to about 4% by weight. Correspondingly, diethylene glycol containing 30% by weight of potassium acetate reduces the benzene solubility to about 14% by weight and with the addition of approximately 6% of diphenylmethane to this glycol—30% potassium acetate solution the solubility of benzene in the solution is reduced to about 2.5% by weight. In the presence of between about 5–15% by weight of water the solubility of benzene is likewise further reduced. Following is a table, containing examples illustrating the results of benzene solubility in various compositions employed for absorption of water from natural gas.

DEPRESSION OF SOLUBILITY OF BENZENE (Bz) IN DIETHYLENE GLYCOL ALONE — WITH WATER — WITH POTASSIUM ACETATE (KOAc) AND WITH DIPHENYLMETHANE (DPM) AT ROOM TEMPERATURE (30° C.)

| Ex | KOAc (wt %) | $H_2O$ (wt %) | DPM (wt %) | BzSol (wt %) |
|---|---|---|---|---|
| 1 | — | — | — | 31 |
| 2 | — | 5.0 | — | 18 |
| 3 | — | 5.0 | 6.0 | 3 |
| 4 | 30 | — | — | 14 |
| 5 | 30 | — | 5.7 | 2.5 |
| 6 | 30 | 5.0 | — | 9.6 |
| 7 | 30 | 5.0 | 3.0 | 0.7 |

Although natural gas can be dehydrated by passing it through one or more stages of dehydrating composition, the normal method is to pass the gas through a counter current zone or system with the dehydrating composition. Such a process is shown and described on page 589 of the aforementioned publication GAS PURIFICATION. The use of such a counter current system with a glycol dehydrating composition containing up to about 33% potassium acetate or formate and between about 5%–15% by water is likewise disclosed in our aforementioned copending application.

In the preferred process a water dehydrating composition, consisting essentially of a glycol, such as diethylene glycol with 25–33% by weight of potassium acetate and about 0.5 to 5% by weight of water, is introduced into the top of a counter current system. Natural gas containing up to about 5% by weight of water is introduced into the counter current system at the bottom. To achieve maximum dehydration the process should be controlled so as to limit the effluent of the water dehydration composition to approximately 15% by weight of water, again as disclosed in our aforementioned application.

In order to obtain the desired depression of aromatic solubility while maximizing water removal from the gas, the water dehydrating composition or solvent initially introduced at the top of a counter current system should contain generally between about 1%–6% by weight of either diphenylmethane or 1,1-diphenylethane as an aromatic depressant. It will be appreciated that the aromatic depressants proposed herein will be adjusted for each particular gas source and dehydration process involving any of the various glycols cited with or without the potassium salts.

The use of the aromatic solubility depressants disclosed not only reduces the cost of regeneration of water solvent but also reduces the cost and difficulty of disposal of otherwise absorbed aromatics during or subsequent to the regeneration process. When dealing with millions of cubic feet per day the savings can be formidable.

Having described the invention and certain embodiments thereof the same is only intended to be limited by the scope of the following claims.

We claim:

1. A process for dehydrating natural gas comprising: passing said natural gas in contact with a water dehydrating composition comprising a glycol selected from the group consisting of triethylene glycol, ethylene glycol and diethylene glycol, and an aromatic solubility depressant selected from the group consisting of diphenylmethane and 1,1-diphenylethane.

2. A process as described in claim 1 wherein the dehydrating composition comprises between about 1–6% by weight of the aromatic solubility depressant.

3. A process as described in claim 2 wherein the dehydrating composition contains up to about 40% by weight of a soluble salt selected from the group consisting of potassium acetate and potassium formate.

4. A process as described in claim 3 wherein the glycol is diethylene glycol, the salt is potassium acetate and the dehydrating composition contains between about 5 to 15% by weight of water.

5. A process for dehydrating natural gas comprising passing said gas in a continuous counter current zone with a dehydrating solvent composition comprising up to about 15% by weight of water, up to about 6% by weight of an aromatic solubility depressant selected from the group consisting of diphenylmethane and 1,1-diphenylethane, and diethylene glycol containing up to about 33% by weight of a dissolved salt selected from the group consisting of potassium acetate and potassium formate.

6. A process for dehydrating natural gas as described in claim 5 wherein the dehydrating solvent composition initially introduced into said counter current zone contains up to about 5% by weight of water.

* * * * *

UNITED STATES PATENT AND TRADEMARK OFFICE
CERTIFICATE OF CORRECTION

PATENT NO. : 5,462,584

DATED : October 31, 1995

INVENTOR(S) : Gavlin et al.

It is certified that error appears in the above-identified patent and that said Letters Patent is hereby corrected as shown below:

Title page, item [75] "Boris Coltsin" and insert in its place --Boris Goltsin--

Insert --Continuation-in-part of pending application Ser. No. 215,757, filed March 21, 1994.-- under the heading --Related U.S. Application Data-- on the cover page of the patent.

In Column 1 after the title, insert --This application is a continuation-in-part of U.S. Patent application Ser. No. 08/215,757, filed March 21, 1994.--

Signed and Sealed this

Nineteenth Day of March, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,462,584

DATED : 31 October 1995

INVENTOR(S) : Gavlin et al.

It is certified that error appears in the above-identified patent and that said Letters Patent is hereby corrected as shown below:

On the title page: Item [63]

Insert --Continuation-in-part of pending application Ser. No. 215,757, filed March 21, 1994.-- under the heading --Related U.S. Application Data-- on the cover page of the patent.

In Column 1 line 3, insert --This application is a continuation-in-part of U.S. Patent application Ser. No. 08/215,757, filed March 21, 1994.--

Signed and Sealed this

Twenty-eighth Day of May, 1996

Attest:

BRUCE LEHMAN

*Attesting Officer*     *Commissioner of Patents and Trademarks*